United States Patent
Poddar et al.

(10) Patent No.: US 11,315,257 B2
(45) Date of Patent: Apr. 26, 2022

(54) METHOD FOR REAL TIME SURFACE TRACKING IN UNSTRUCTURED ENVIRONMENTS

(71) Applicants: Prakash Crj Naidu, Ottawa (CA); Amal Thomas Kakkassery, Thrissur (IN); Soumyajit Poddar, Kolkata (IN)

(72) Inventors: Soumyajit Poddar, Kolkata (IN); Amal Thomas Kakkassery, Thrissur (IN); Prakash Crj Naidu, Ottawa (CA)

( * ) Notice: Subject to any disclaimer, the term of this patent is extended or adjusted under 35 U.S.C. 154(b) by 0 days.

(21) Appl. No.: 16/862,143

(22) Filed: Apr. 29, 2020

(65) Prior Publication Data
US 2020/0258237 A1 Aug. 13, 2020

Related U.S. Application Data

(60) Provisional application No. 62/840,433, filed on Apr. 30, 2019.

(51) Int. Cl.
| | | |
|---|---|---|
| G06T 7/20 | (2017.01) | |
| G06T 7/70 | (2017.01) | |
| G06T 3/40 | (2006.01) | |
| G06T 7/11 | (2017.01) | |

(52) U.S. Cl.
CPC ............... *G06T 7/20* (2013.01); *G06T 3/40* (2013.01); *G06T 7/11* (2017.01); *G06T 7/70* (2017.01); *G06T 2207/10016* (2013.01)

(58) Field of Classification Search
CPC .... G06K 9/00228; G06K 9/4628; G06T 3/40; G06T 2207/10016; G06T 2207/30241; G06T 7/20; G06T 7/70; G06T 7/11
See application file for complete search history.

(56) References Cited

U.S. PATENT DOCUMENTS

| | | | |
|---|---|---|---|
| 6,295,367 B1* | 9/2001 | Crabtree | G01S 3/7865 |
| | | | 382/103 |
| 9,019,381 B2* | 4/2015 | Guler | G06K 9/3241 |
| | | | 348/169 |
| 2010/0316298 A1* | 12/2010 | Swaminathan | G06K 9/00261 |
| | | | 382/209 |
| 2016/0205341 A1* | 7/2016 | Hollander | H04N 7/015 |
| | | | 375/240.08 |
| 2016/0335490 A1* | 11/2016 | Wang | G06K 9/00778 |
| 2018/0012463 A1* | 1/2018 | Chaudhry | H04N 7/18 |

* cited by examiner

*Primary Examiner* — Michael J Vanchy, Jr.

(57) ABSTRACT

Although object surface or human face recognition systems have already achieved an impressive efficiency in recent years, the object surface or human face as well as object to object or person to person tracking task still remains challenging, especially under non-ideal conditions, as is common in driverless vehicles, surveillance or security based applications, particularly in unstructured environments. In this disclosure, data captured through artificial vision system, e.g. CCTV surveillance is analyzed identifying the object or person and object's or person's movements across the respective platform. Image regions are categorized based on the population density. The regions are subsequently decomposed adaptively into tree of image patches. Furthermore, the surfaces are later stored efficiently and retrieved as patches. Consequently, the method disclosed is an efficient and adaptive method of constructing a path tracking data structure of arbitrary surfaces with graphical information facilitating better computability.

14 Claims, 5 Drawing Sheets

METHOD FOR REAL TIME SURFACE TRACKING IN UNSTRUCTURED ENVIRONMENTS

STATEMENT REGARDING FEDERALLY SPONSORED RESEARCH OR DEVELOPMENT

The work on which the disclosure of this application is based is not funded by any Federally Sponsored Research or Development in the United States of America.

FIELD OF THE INVENTION

The present invention is directed to surface tracking, image segmentation and motion recording for processing after obtaining the images from artificial vision systems, particularly in unstructured environments.

DESCRIPTION OF THE RELATED ART

The summary of related art includes methods, experiments, surveillance datasets, baseline surface recognition, and efforts towards boosting the performance. Pei, et al. extend evaluations using more datasets including SCface, UCCSface and the MegaFace challenge 2 LR subset [Li, Pei, et al.: On Low-Resolution Face Recognition in the Wild: Comparisons and New Techniques, IEEE Transactions on Information Forensics and Security, 2019].

Notably, most previous work on landmark estimation use densely-connected elastic graphs which are difficult to optimize. Consequently, much effort in the area has focused on optimization algorithms for escaping local minima. For example, Ramanan et. al. show that multi-view trees are an effective alter-native because they can be globally optimized with dynamic programming and surprisingly, they still capture much relevant global elastic structure [Ramanan, Deva, and Zhu: Face detection, pose estimation, and landmark localization in the wild, Proceedings of the 2012 IEEE Conference on Computer Vision and Pattern Recognition (CVPR), 2012].

Towards applications, Levinkov et. al. have reported that the NL-LMP offers a common mathematical abstraction of seemingly unrelated computer vision tasks, including multiple object tracking, instance-separating semantic segmentation and articulated human body pose estimation [Levinkov et. al.: Joint graph decomposition & node labeling: Problem, algorithms, applications. Proceedings of the IEEE Conference on Computer Vision and Pattern Recognition, 2017].

In the early 2000s, graph embedding algorithms were mainly designed to reduce the high dimensionality of the non-relational data by assuming that the data lies in a low dimensional manifold. The design of the data collection campaign was significantly influenced by time and budget restrictions of the research study, resulting in the development of a method relying on heavy computer vision techniques and graph theory optimization [Cai et. al.: A comprehensive survey of graph embedding: Problems, techniques, and applications, IEEE Transactions on Knowledge and Data Engineering 30.9, pp 1616-1637, 2018].

Long-term real-time tracking of human faces in the wild is a challenging problem because the video may include frame cuts, sudden appearance changes, long-lasting occlusions, etc. This requires the tracking system to be robust and invariant to such unconstrained changes. A DVT method is presented which accomplishes the long-term face tracking task through the collaboration of face detection, face verification, and short-term face tracking [Zhang et. al.: Long-term face tracking in the wild using deep learning, preprint arXiv:1805.07646 (2018)].

Recently there has been a considerable amount of work on learning the dynamical model of interacting systems using implicit interaction models (Sukhbaatar et al., 2016; Guttenberg et. al., 2016; Santoro et. al., 2017; Watters et. al., 2017; Hoshen, 2017; van Steenkiste et. al., 2018). These models can be seen as graph neural networks (GNNs) that send messages over the fully-connected graph, where the interactions are modeled implicitly by the message passing function with the help of an attention mechanism [Kipf et. al.: Neural relational inference for interacting systems, preprint arXiv:1802.04687 (2018)].

An image can be represented as a square grid graph whose nodes represent pixels. Consequently, a CNN can be viewed as traversing a node sequence and generating fixed-size neighborhood graphs for each of the nodes. The neighborhood graphs serve as the receptive fields to read feature values from the pixel nodes [Niepert et.al.: Learning convolutional neural networks for graphs, International conference on machine learning, June 2016, pp. 2014-2023]. Face position and size are estimated based on robust statistical measurements which are derived from two one-dimensional histograms obtained by projecting the result of skin color filtering. An algorithm proposed by Bradsky utilizes a linear Kalman filter and a simple nonlinear filter to perform smooth tracking and to remove jitter; the algorithm has been implemented and tested under a wide range of real-world conditions [Bradski: Computer vision face tracking for use in a perceptual user interface, Intel Report, 1998]. A method is reported [Bradski et. al.: Motion Segmentation and Pose Recognition with Motion History Gradients, Machine Vision and Applications Conference, 2000, pp. 238-244] for representing motion in successively layered silhouettes that directly encode system time termed the timed Motion History Image WHO. This representation can be used to both determine the current pose of the object and to segment and measure the motions induced by the object in a video scene corresponding to the moving parts of the object of interest. This method may be used as a very general gesture recognition tool.

In order to compute a new probability that a pixel value belongs to the target model, multidimensional histogram is weighted with a simple monotonically decreasing kernel profile prior to histogram back projection. Consequently, the effectiveness of this approach is evaluated by comparing the results with a generic implementation of the Mean Shift algorithm in a quantized feature space of equivalent dimension [Allen et.al.: Object tracking using camshift algorithm and multiple quantized feature spaces, In Proc. of the Pan-Sydney area workshop on Visual information processing, Australian Computer Society, 2004].

A non-invasive interface to track eye position using digital image processing techniques is under development. Information about head and eye position is obtained from digital images. The objective is to develop an interface to detect eye position based only on digital image processing algorithms, free of electrodes or other electronic devices [Perez et. al. Face and eye tracking algorithm based on digital image processing, 2001 IEEE International Conference on Systems, Man and Cybernetics: e-Systems and e-Man for Cybernetics in Cyberspace (Cat. No. 01CH37236), Vol. 2, IEEE, 2001].

A fast algorithm is reported by Yoo et.al. [Yoo et. al.: A fast algorithm for tracking human faces based on chromatic histograms, Pattern Recognition Letters 20.10, pp 967-978, 1999]. A multi-modal approach to human-face detection is reported [Vadakkepat, et. al.: Multimodal approach to human-face detection and tracking, IEEE transactions on industrial electronics 55.3, pp 1385-1393, 2008]. Object tracking using pre-existing YOLO v2 library is reported [Gen Gang et. al.: Visual Person Behavior Diary Generation (VPBDG) model used on trajectories and face estimation] that tracks the behavior of moving person and collects associated faces by an existing face detector. The method is offline requiring cloud analysis, and is data intensive.

Swaminathan et. al. [US20100316298A1] have disclosed a method where one face is shown from multiple views, then the face is tracked based on particle velocity estimation. In this method, partition from a single face is tracked, without using deep neural network approaches. Trajectories of the face are not tracked in this method. Zang et. al. [U.S. Pat. No. 8,098,885B2] disclosed a robust outline face tracker based on particle filters to reduce filter for fast moving objects, using multiple filters based on different resolutions regions. Dedicated hardware is required in this approach that increases the cost of the system. As more image data is to be buffered, i.e. video stream is to be stored in the system, larger memory space is required.

Porter et. al. [US20060104487] disclosed an approach for face tracking limited to indoor environment. Martinson and Yalla [US20160180195A1] disclosed entire body tracking by taking multiple slices for only one person. It estimates pose by using an expensive depth sensor with limited field of view, moreover subjects are only classified at a short distance where the full body frame is partially visible. Bouguet et. al. [U.S. Pat. No. 9,400,921B2] disclosed use of stereo/depth image for tracking face without utilizing surveillance cameras. Daliyot et.al. [U.S. Ser. No. 10/095, 954B1] disclosed support vector machine based trajectory estimation using two trajectories at a time. This method required another dedicated device/hardware.

Agaian [WO2013049153 A2] disclosed an approach for computing pixels along with object edges and producing a de-interlaced image from an interlaced source by fractal base method. Bhatti [US20090245617 A1] disclosed an approach for image capturing using a device. Image segmentation is not mentioned in it. Campos [U.S. Pat. No. 8,774,498 B2] disclosed an approach for representing an image using weighting feature. It is neither using graph nor segmentation. Zhou [EP1912161 A2] disclosed an approach for automatically categorizing an image comprises extracting features of the input image and generated a signature vector. Different variables of CNN are directly applied on an input image for extracting signature vector. Zhou [US20090060340 A1] disclosed an approach for automatic categorization of input image using texture features. Here neither face recognition nor tracking is used.

Frisken [EP1074946 B1] disclosed an approach for shape or surface modeling using optimized data structure. Chauvin [JP2004102998A] disclosed an approach for reducing the rendering overhead by a high speed parallel processing device. But the applications of respective device do not include surface tracking. Rudin [U.S. Pat. No. 8,014,588 B2] disclosed an approach for finding three-dimensional images from two-dimensional images of static objects. Saund [U.S. Pat. No. 6,903,751 B2] disclosed and approach for creating and editing image of documents. Mitta [WO2007090093 A2] disclosed an approach for facilitating cardiac intervention. Yadegar [US20050131660 A1] disclosed an approach that is dealing with binary decomposition of rectangular images and decomposition.

In summary, although there is considerable work reported in the area of image categorization and segmentation and efforts to improve efficiency have been disclosed, there is still scope to address requirements of low computation and memory overheads, particularly directed to unstructured environments. The prior art does not address the problem of multiple surface motion tracking in unstructured environments, e.g. in the wild, or on a pathway in case of driverless vehicle, as it consumes a considerable amount of data, computational overhead and bandwidth to stream the video, store or retrieve it to/from the cloud server and continuously monitor a high resolution frame.

BRIEF SUMMARY OF THE INVENTION

Some aspects of the invention are related to monitoring the movement of a plurality of objects (non-living such as vehicles on roads, as well as living such as animals or humans) in an unstructured environment where there is a need for sensing the objects without the use of continuous high bandwidth data transfer to or from a cloud server. Further, and in addition, some aspects of the invention are applicable to address the requirement of a low computation and memory overhead real time method for an embedded processing device. An example of plurality of objects in an unstructured environment where there is a need for sensing the objects is a self-driving car (for example, Waymo™ of Google®, Mountain View, Calif., USA; Tesla® Autopilot, Palo Alto, Calif., USA; several others) requiring sensing of object surfaces in the vicinity and also at reasonable distance in order to take anticipative corrective navigation actions in a timely manner.

An image segmentation method is disclosed wherein an image from a video frame is captured and decomposed into a plurality of regions based on the density of faces of people or typical surfaces of target objects in each region. Further, preferably, but optionally and in addition, adaptive segmentation is used to locate and label the surface positions of all objects or face positions of all people present in regions of varying density of surfaces or faces. A highly dense region entails a more fine grained detailed segmentation. According to another additional and optional method of the invention, the granularity of segmentation adapts to the number density of people or objects over time.

An aspect of the invention is the real time processing of motion tracking graphs of the surfaces present in the image frames captured from the video stream of a surveillance camera device. Every successive frame and the graph associated with it is compared to detect changes in position and a motion trail is formed that may be stored locally in a server and uploaded to the cloud periodically. Those skilled in the art may appreciate the reduction in data bandwidth when only video is uploaded to the cloud server directly without processing.

The methods disclosed and their inventive aspects described are only representative, and do not limit to only the examples presented. Those skilled in the art may appreciate that there can be several variants of utilization and implementations of the disclosed methods, all of which are intended to be covered by this disclosure.

DETAILED DESCRIPTION OF THE INVENTION

The configuration of embodiment and functioning of disclosed method are described in the following paragraphs explaining the Figures in more detail.

Figure 1:
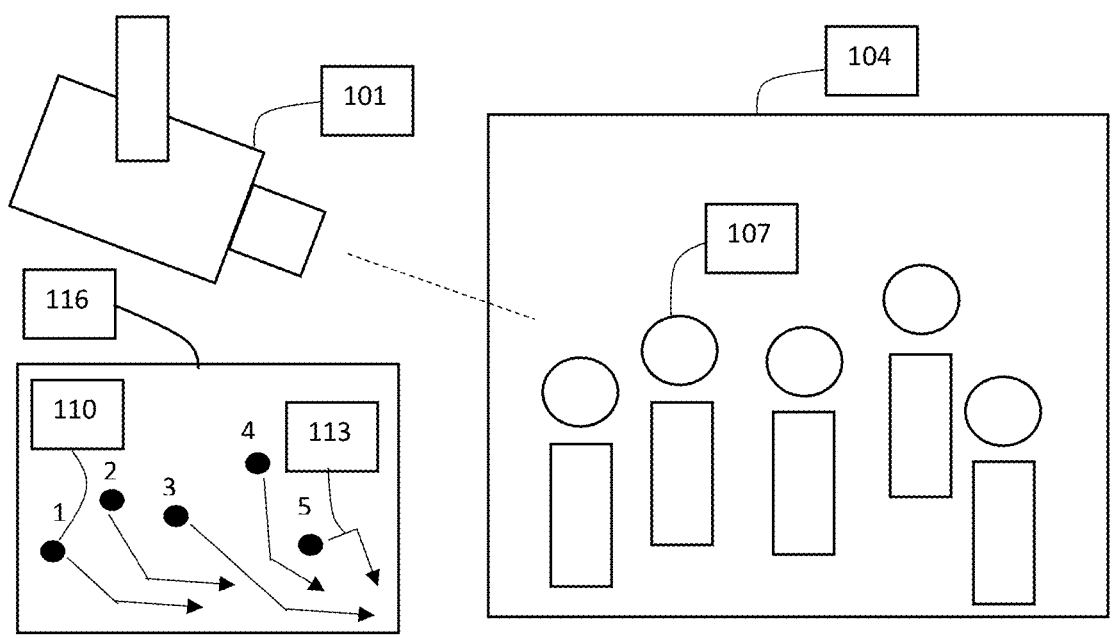
FIG. 1 illustrates block diagram/schematic of the method disclosed.

FIG. 1 discloses a Block diagram/Schematic of the method. A Surveillance camera 101 is pointing towards a set direction. The field of view, focal length, elevation above ground and the viewing angle of the camera are known as parameters. The camera parameters may change only during installation and maintenance tasks. A single frame 104 in the video stream is obtained from the camera. The aspect ratio and area of the frame is fixed.

The faces 107 of people or surfaces of objects present in a particular frame 104 are detected using a standard deep neural network based surface detection method. The tracking of the surface is done and a collection of graphs 110 is constructed for all surfaces viewed in the particular frame. Every surface is detected by neural network based classifier and the center of each surface 113 is constructed into a set of Cartesian coordinates that are used by the method described in this embodiment. The path 116 covered by each surface is a set of given frames and is marked as a sequence of positions. The above positions are found from the fixed parameters associated with the camera 101.

Figure 2:
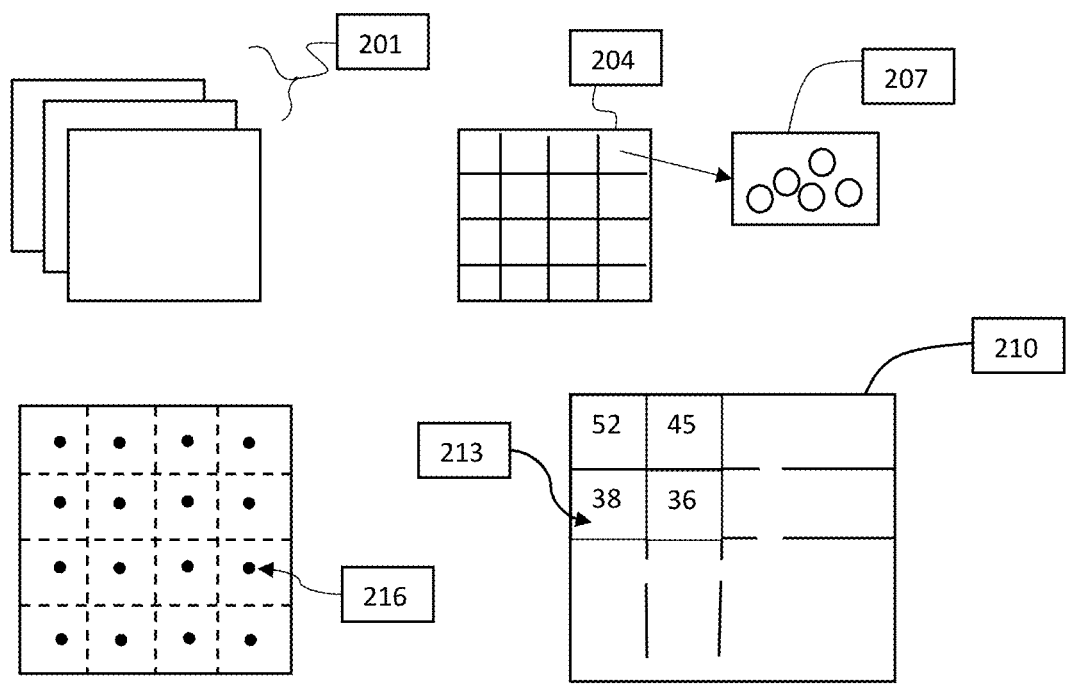
FIG. 2 describes a method to label certain regions of an image frame captured by the camera in FIG. 1 with density of surface in the concerned region.

FIG. 2 describes a method to label certain regions of an image frame captured by the camera in 101 with density of surface in that region. A video stream 201 containing a plurality of image frames captured by a camera in 101 is described herein.

The division of a particular frame sequentially selected from the stream in 201 into a plurality of homogeneous rectangular regions 204 is used for further face or surface detection. A set of faces or surfaces 207 is detected by a convolutional neural network within one rectangular region from the frame in 204. An entire frame 210 within the homogenous regions is labelled by the number of surfaces covered by it.

A label 213 is associated with one singular region. The number of surfaces is used as a label value for this region. Each rectangular region has a centroid 216 which is moved in the image frame of 204, the label is stored as a separate value to be used later.

Figure 3:
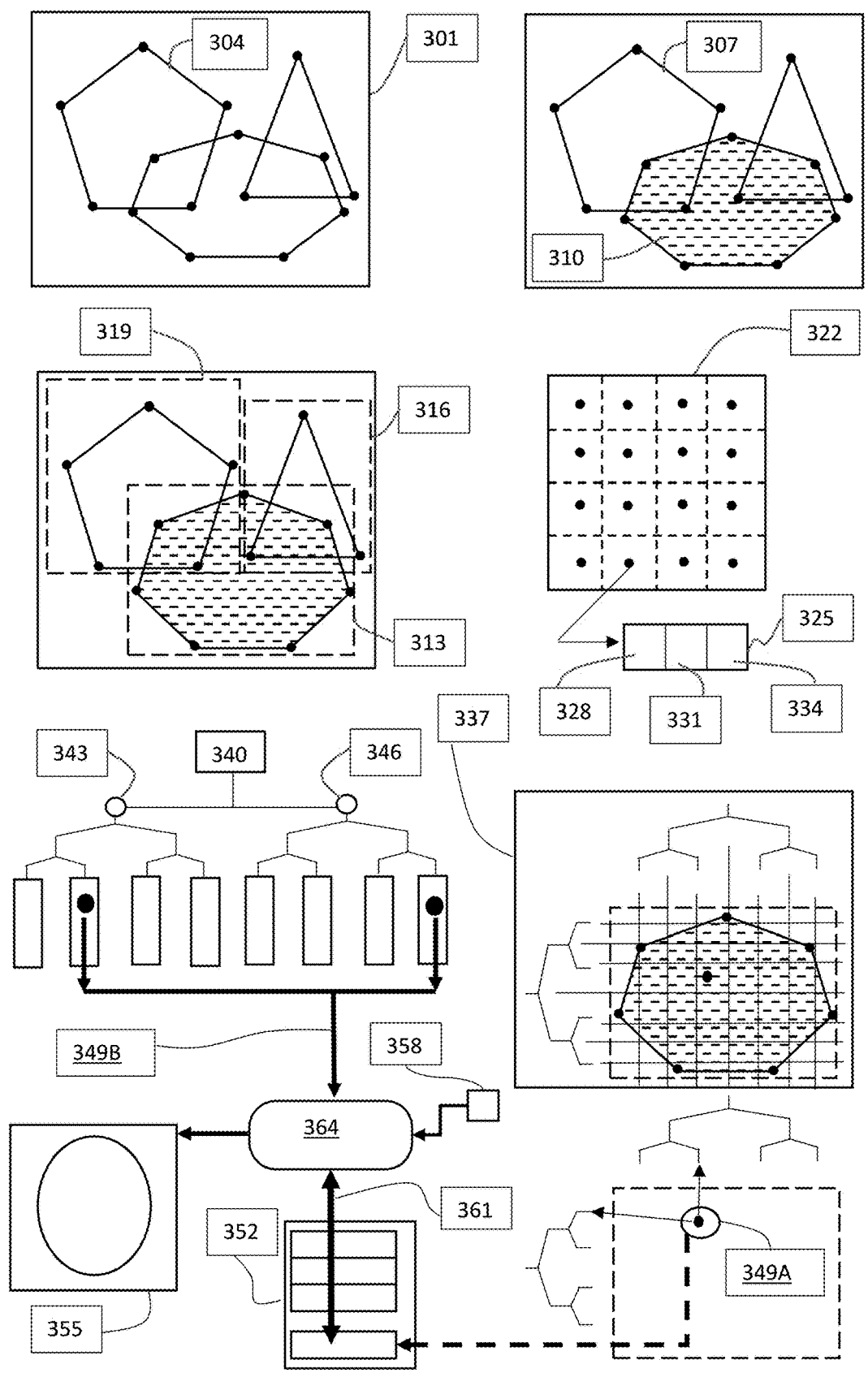
FIG. 3 describes an efficient method to sample the surficial or facial position.

Initially, the frame 204 is captured and marked by the method underlined in 216 is further processed to be divided into a plurality of sub-regions according to densities of surfaces. By density of faces or surfaces, it is meant as the number of faces or surfaces present per unit area. FIG. 3 describes an efficient method to sample the facial position. A convex polygon 304 is constructed for a sub region with particular density. Methods like Convex Hull or any other method apparent to those skilled in the art may be used to construct the polygon. The polygon with shaded internal area 310 is denser than the other polygons 307 stored in the figure.

Bounding rectangles 313, 316, 319 are used to cover the polygons. An extended frame 322 of 204 is produced with the density classified into a plurality of thresholds based on the population density. Due to the density thresholds, a vector 325 of discrete values 328, 331, 334 are assigned to each centroid of a rectangular region in 322. A single rectangular sub-region 337 bounding a polygon is isolated. The region is divided by a plurality of vertical and horizontal lines. Each of such lines is part of a binary tree data structure as shown in 340. A line is represented as a node in these trees.

The super-root data structure 340 contains pointers to two binary trees, the horizontal tree 346 and the vertical tree 343. A particular surface centroid is shown as a singular point 349A. This point is in proximity to a horizontal and a vertical line that correspond to a vertical tree leaf node and a horizontal tree leaf node respectively. A pair of horizontal and vertical surface-centroid positional data 349B are retrieved as a pair of tree leaf nodes respectively. The horizontal and vertical leaf nodes are present within trees 346 and 343 respectively. The corresponding centroid position along with the face or surface identification metadata stored in a list 352, is retrieved.

A list of all image patches 352 is produced, each containing a singular face or surface centered at points like 349A. This singular patch contains a lower resolution facial image, that is retrieved as a record 361 when the face or surface identification metadata is provided as a face-ID or surface-ID as in 358. 364 is a reconstruction neural network using super resolution techniques or otherwise, apparent to those skilled in the art that reconstructs a high resolution facial image 355, from surface-ID 358.

Figure 4:
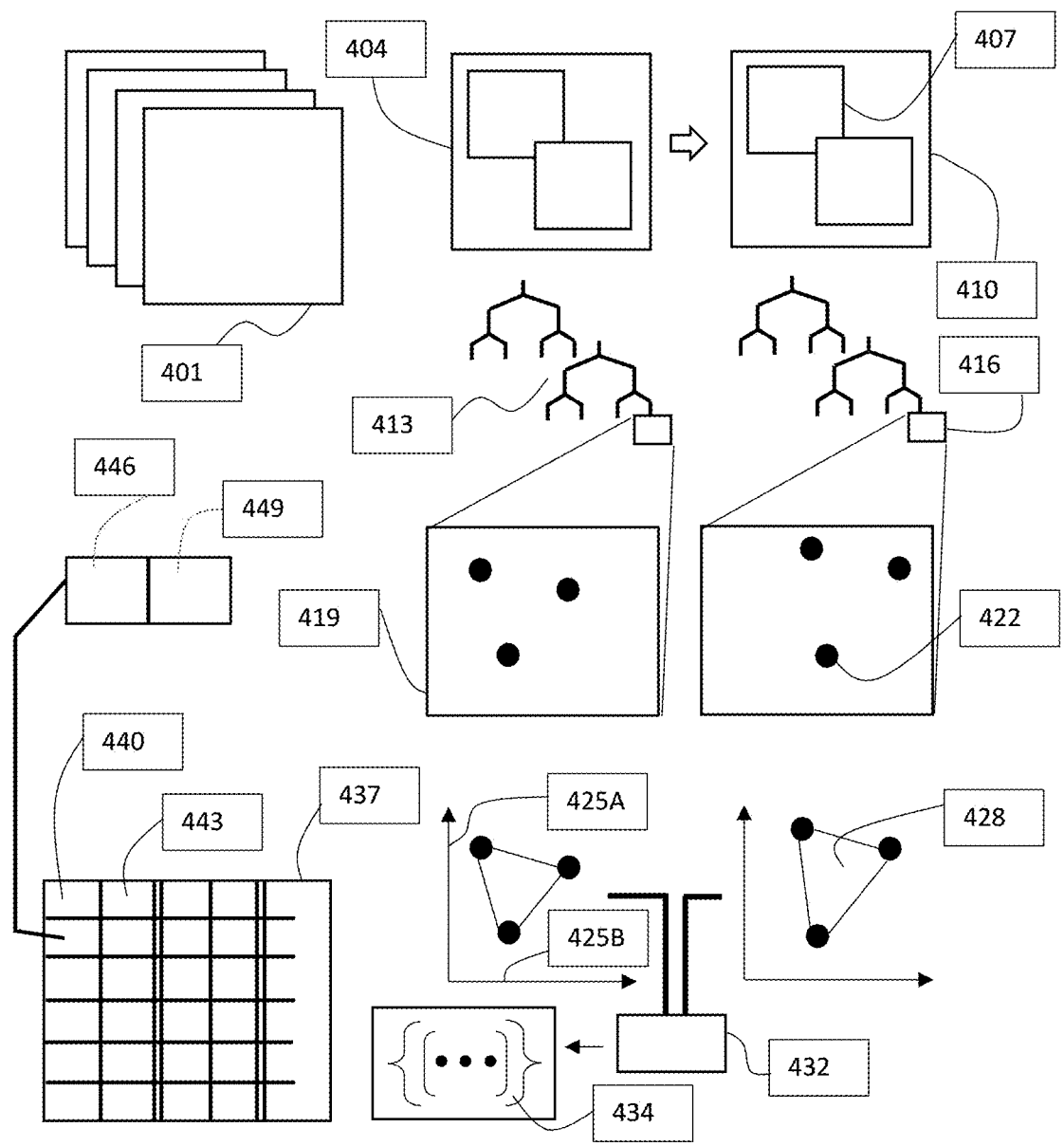
FIG. 4 illustrates a method to track surfaces in a video using graphical and neural network based techniques.

FIG. 4 illustrates a method to track surfaces in a video using graphical and neural network based techniques. A video frame 401 is captured by a camera shown in 101. Two consecutive frames 404 and 410 are captured from the video stream 401. A particular rectangular bounding box 407 for a sub region of certain density of surfaces is obtained by the method described in FIG. 3. A tree 413 is associated with each sub-region 407. Leaf node regions 416 and 419 contain a plurality of surface centroid positions 422. The spatial axes 425A and 425B are dimensions in a Euclidian space. A graph 428 is constructed with vertices as surface centroids like 422. The graph is a fully connected set of nodes with edge weights as distances.

A graph convolutional neural network 432 matches the similarity features between a plurality of graphs in a set of consecutive frames and produces a similarity index vector 434, with entries for each vertex pair. A table 437 of pairs of entries 440 and 443 corresponding to the two edge vertices that were presented to graph 432 are retrieved from vector 434. The surface-ID 446 and position 449 are the components of each entry in table 437.

Figure 5:
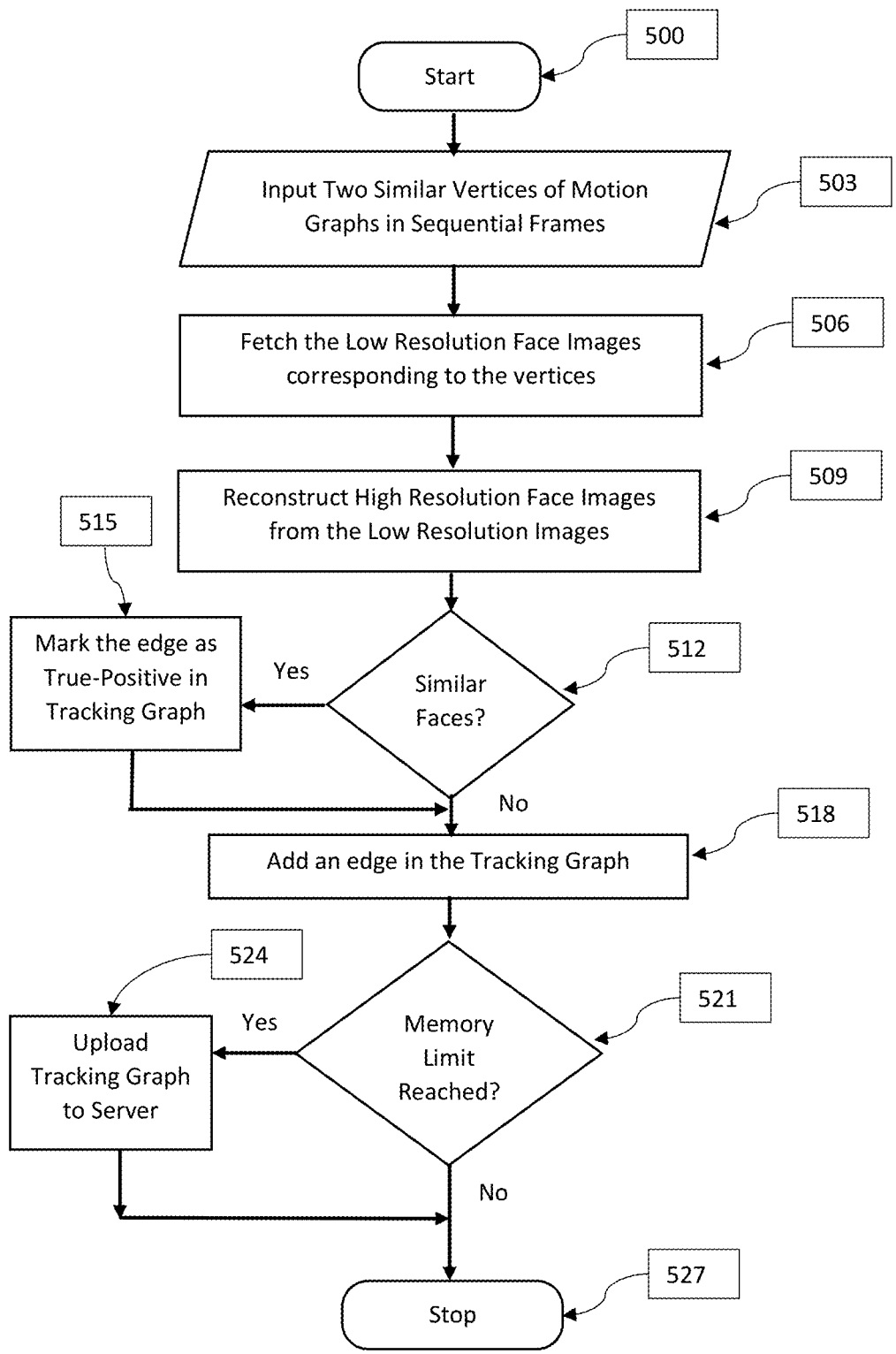
FIG. 5 describes the algorithm to build a tracking graph for the surfaces seen by camera.

FIG. 5 describes the algorithm 500 to build a tracking graph for the surfaces seen by camera. 503 inputs two similar vertices of motion graphs in sequential frames. Low resolution face or surface images corresponding to the vertices are fetched in step 506, and high resolution face or surface images are reconstructed from the low resolution images using super resolution techniques as in step 509. Step 515 is executed if similar surfaces are detected in step 512. Then the edge is marked as True-Positive in tracking graph. If it is not, then an edge is added in the tracking graph in step 518.

If the memory-exceeded check in 521 is true, then the tracking graph is upload to server in step 524. If not, then the algorithm is complete for this iteration in step 527.

Figure 6:
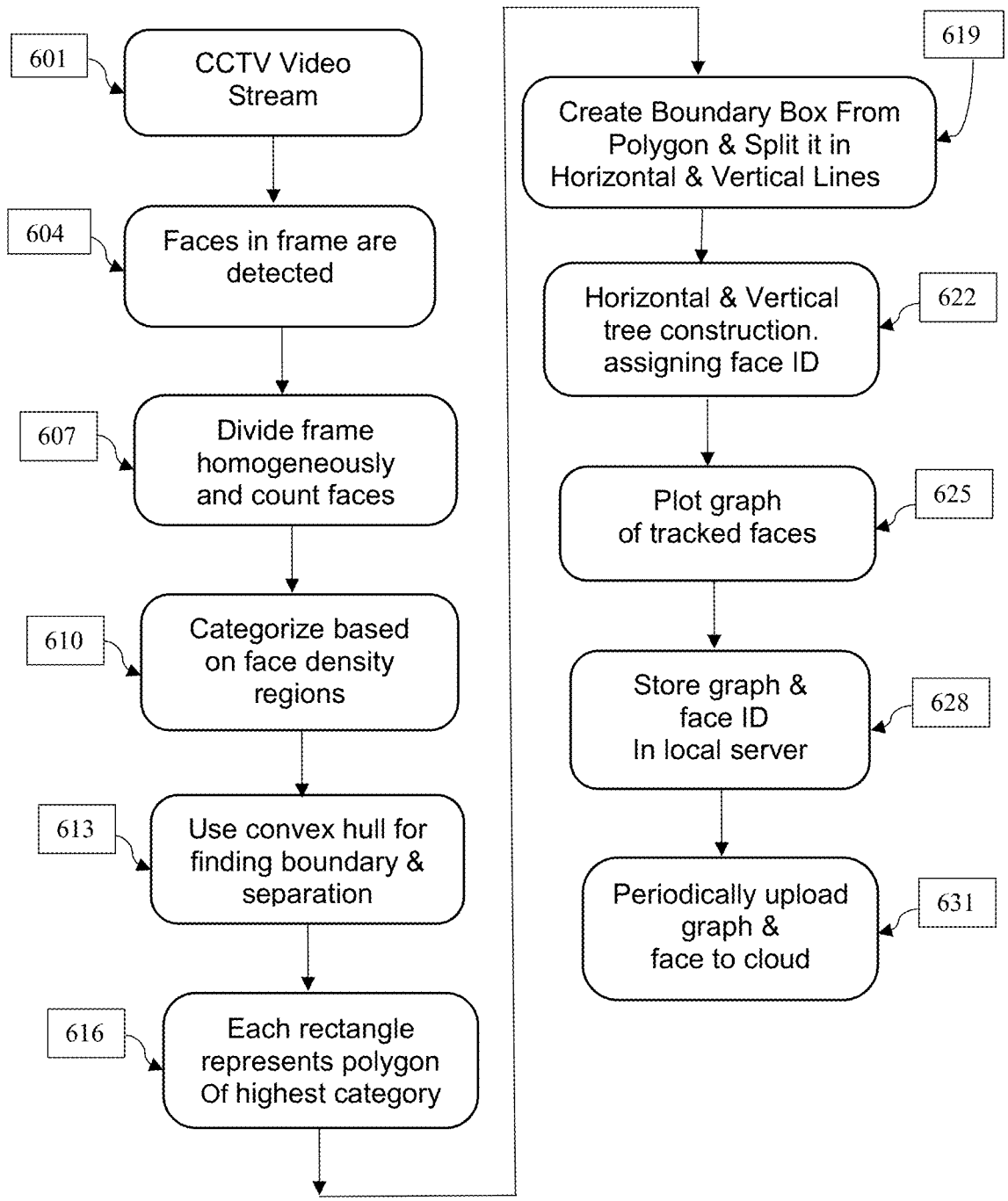
FIG. 6 illustrates a flow chart of the disclosed method

FIG. 6 describes the flow chart of the method. Step 601 describes about the input, such as multiple cameras are installed and video stream from the CCTV cameras are captured. Step 604 describes the detecting of the total number of faces or surfaces in the respective frame during the given timestamp, using facial detection algorithms. Step 607 describes counting the total number of faces or surfaces in each rectangle. In step 610 the faces or surfaces are categorized based on face density or surface density regions. To find the boundary and separation of the surfaces across one region, convex hull 613 or any other algorithm is used. While using convex hull, in step 616 each rectangle represents a polygon of the highest density category. Each polygon contains a set of similar density surfaces in the frame. Processing power of the system used to implement the algorithm determines the number of categories.

In step 619, a boundary box is created from the polygon and it is split into horizontal and vertical lines. Step 622 describes about tree construction. Face or surface IDs are assigned and also a tree is created based on horizontal and vertical lines. Step 625 describes about plotting the tracked facial data. For each consecutive frame, we match graphs. For each frame, we find the common vertex by using GCN.

In step 628, the face ID or surface ID is stored corresponding to each vertex in the corresponding list. Then the extracted tracking information graphs and face IDs or surface IDs are stored in the local server. In 631, the collected data is periodically uploaded from the local server to cloud based on storage capacity of local server.

The method disclosed has been tested on the Raspberry Pi Model 3B+ Model No. BCM2837B0 (Raspberry Pi, Cambridge, UK) with the Intel Movidius Neural Compute stick Model No. NCSM2450.DK1 (Intel Corp., San Mateo, Calif., USA), and Pi Camera Model No. 5MP Raspberry Pi 3 Model B Camera Module Rev 1.3 (Raspberry Pi, Cambridge, UK); and is found to perform satisfactorily serving the intended purpose of lower computation and memory overhead.

We claim:

1. A process of monitoring movement of objects comprising steps of
capturing an image frame from a video stream;
detecting surfaces in said frame;
decomposing the image frame into a plurality of regions based on density of surface features of objects in the regions comprising of steps
dividing image frame homogeneously and counting surfaces,
categorizing based on surface density regions,
using convex hull for finding boundary and separation,
representing density of surfaces by means of convex polygons,
creating boundary box from polygon and adaptively splitting it in horizontal and vertical lines with different pitch depending on surface density,
constructing trees of horizontal and vertical lines,
assigning surface identification to leaf nodes of the trees;
comparison of successive frames;
construction of motion tracking graphs associated with said frames;
real-time processing of the graphs by deployment of deep graph convolutional neural network comprising of the steps
matching similarity features between a plurality of graphs in a set of consecutive frames,
producing similarity index vectors with entries for each pair of similar surfaces whose positions have changed due to their motion,
formation of motion trails in parallel;
detection of changes in position of the objects comprising of steps
comparing pair of trees of horizontal and vertical lines in successive image frames,
modifying the pitch between vertical and horizontal lines adaptively depending on density of surfaces in preceding frames;
storage of detected position change information in a local server or cloud server or both.

2. A process as per claim 1 wherein the objects contain a set of typical or common surface features.

3. A process as per claim 1 wherein the video frame is captured by a video camera.

4. A process as per claim 2 wherein the objects are moving objects on a pathway.

5. A process as per claim 2 wherein the objects are humans or animals.

6. A process as per claim 1 wherein at least one said region is a rectangular region.

7. A process as per claim 1 wherein vertices of said polygons are centroids of said surfaces.

8. A process as per claim 1 wherein the polygons are decomposed into a plurality of tree data structures of image-patches wherein each image-patch comprises a group of pixels of one object.

9. A process as per claim 8 wherein efficient storage and retrieval of the group of pixels corresponding to an object is achieved as the group of pixels is a relatively lower resolution representation of said object.

10. A process as per claim 9 wherein construction of a motion trail of an object is stored as a graph data structure in addition to the low resolution image representation of said object.

11. A process as per claim 1 wherein at least one object is assigned a unique identification number for efficiently retrieving the motion trail of said object through its unique identification number.

12. A process as per claim 1 wherein low memory requirement to store the motion trail data is achieved.

13. A process as per claim 1 wherein storage requirement is reduced by streaming of the motion trail data and its storing at the cloud server done at intermittent intervals instead of continuously.

14. A process as per claim 1 wherein the input image frames may be of low resolution but the output surface feature data may be of higher resolution.

* * * * *